(12) United States Patent  (10) Patent No.: US 7,681,358 B1
Stepanek  (45) Date of Patent: Mar. 23, 2010

(54) FLORAL POT COVER WITH ELEGANT, BRUSHED MATTE FINISH

(75) Inventor: Peter Bruce Stepanek, Amherst, NH (US)

(73) Assignee: Hampshire Paper Corp., Milford, NH (US)

( * ) Notice: Subject to any disclaimer, the term of this patent is extended or adjusted under 35 U.S.C. 154(b) by 78 days.

(21) Appl. No.: 12/214,457

(22) Filed: Jun. 19, 2008

Related U.S. Application Data

(60) Provisional application No. 60/937,209, filed on Jun. 27, 2007.

(51) Int. Cl.
*A01G 9/02* (2006.01)
(52) U.S. Cl. ........................................ 47/72; 428/411.1
(58) Field of Classification Search ........................ 47/72
See application file for complete search history.

(56) References Cited

U.S. PATENT DOCUMENTS

| | | | | |
|---|---|---|---|---|
| 4,297,187 A | * | 10/1981 | Deguchi et al. | 204/165 |
| 4,546,029 A | * | 10/1985 | Cancio et al. | 428/141 |
| 5,576,089 A | * | 11/1996 | Weder | 428/142 |
| 5,922,455 A | * | 7/1999 | Stepanek | 428/332 |
| 6,387,459 B1 | * | 5/2002 | Weder | 428/29 |
| 2004/0166337 A1 | * | 8/2004 | Chang et al. | 428/461 |
| 2005/0276980 A1 | * | 12/2005 | Decker et al. | 428/411.1 |

* cited by examiner

*Primary Examiner*—Francis T Palo
(74) *Attorney, Agent, or Firm*—Stephen W. White; Sanjiv Chokshi

(57) ABSTRACT

A pot cover with a matte finish is formed from a series of layers laminated together. The layer comprise a biaxially oriented film layer having a heat sealable matte finish skin on one side and is laminated to a corona treated side of a polyethylene film interlayer with a heat sealable layer on the other side thereof. An aluminum foil is then laminated to the heat sealable able layer of the interlayer. This laminated product may then be formed under heat and vacuum using coming molding techniques to a most desirable pot cover for flowers or plants.

5 Claims, 3 Drawing Sheets

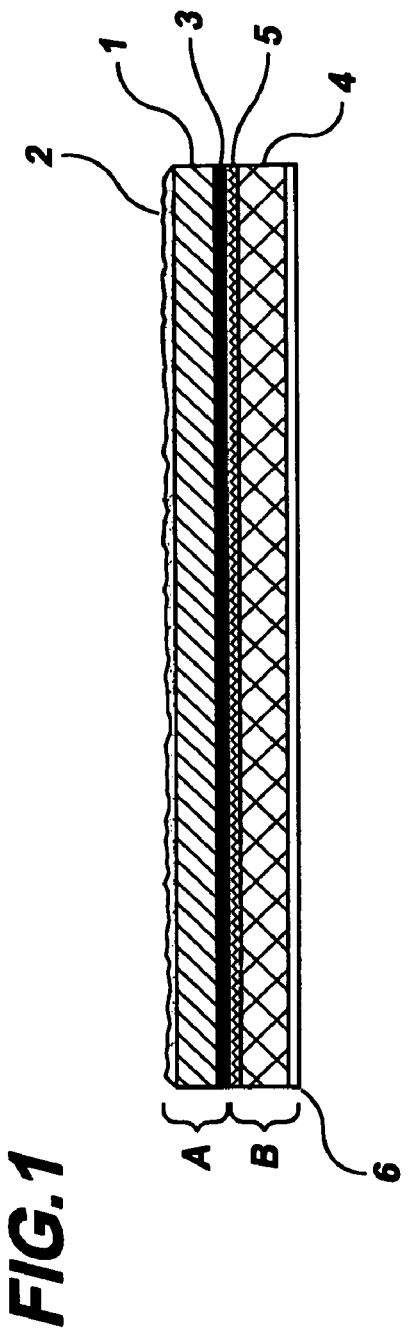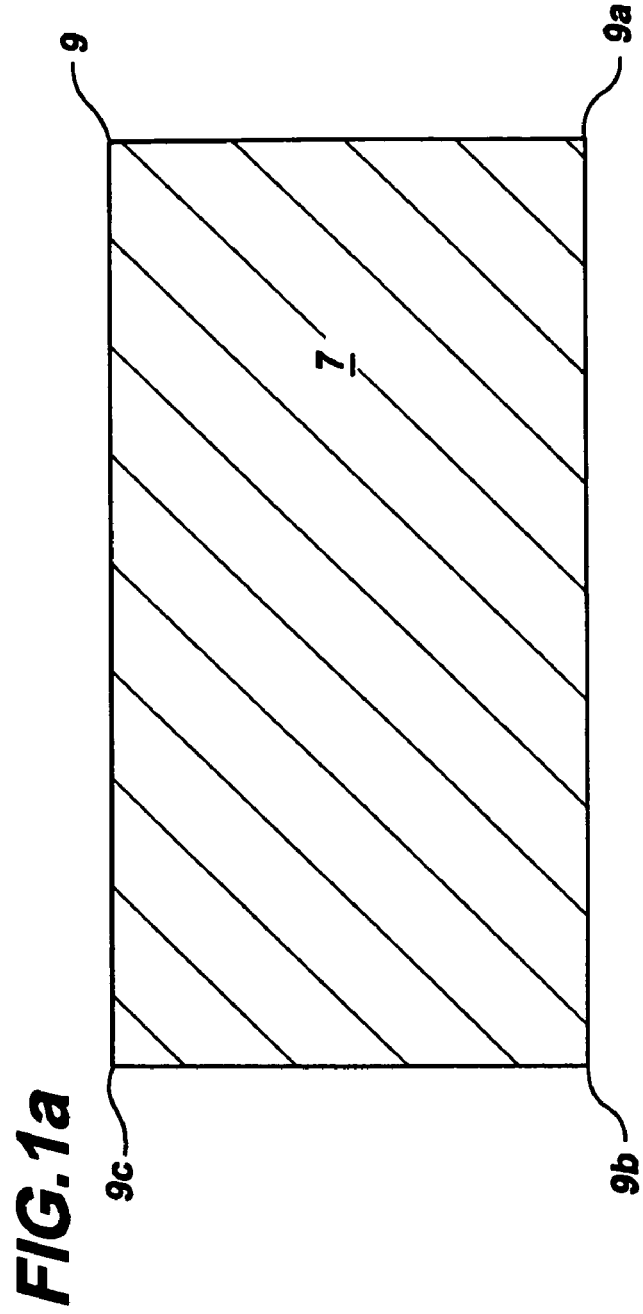

FLORAL POT COVER WITH ELEGANT, BRUSHED MATTE FINISH

CROSS-REFERENCE TO RELATED APPLICATIONS

This application is directly related to and depends from my Provisional Patent Ser. No. 60/937,209 filed Jun. 27, 2007.

BACKGROUND OF THE INVENTION

1. Field of the Invention

This invention relates to the field of floral pot covers that are made and then used to decorate the surface by surrounding the traditional flower pot or the like. This invention also relates to a novel pot cover made so as to present an elegant, brushed matte finish. This invention also relates to a process for the manufacture of elements that have this brushed matte finish.

2. Description of the Prior Art

There are a host of elements described in the prior art that are used to form covers for pots designed to hold flowers and shrubs, for example. Most of these are made using laminated materials that can be formed in a machine that forms the right shape useful to cover the desired pot and also make a filmy delicate looking cover that presents a look that disguises the actual pot and is pleasing to the eye of the purchaser. These elements also are useful for holding in excess water that may be present within said pot. These prior art elements are generally made by forming a self laminating polymer film into the desired shape under heat and pressure or alternatively may be made by laminating such a polymer layer to a thin aluminum layer and then putting the resulting laminate through the process of heat and pressure in specific equipment to form the pot cover. Much of the prior art is devoted to a plethora of such products changing only the shape or the process by which the heated lamination occurs.

The prior art describes the process of forming both round and pointed or squared pot covers and also describes how the surface may be modified in order to show a more decorative element. One conventional pot cover is made from just such a laminated polymer film/metalized film element with a square shape prior to insertion into the device which forms the actual pot cover. When this square shape is used, the pot cover will have a number of folds and pleats around the base of the pot and also a functional skirt portion that comes up and around the stems of the floral element, which then provides some structure and also obscures the soil within the pot. It is also usual to put a colored layer in between the metalized film and the polymer layer and this can be done by applying a dye or ink to one side of the polymer layer or on top of the metalized film polymer. In addition, various designs and the like can be applied to the outer surface so as to further decorate the pot cover itself. In the end the pot cover usually has the metalized film layer inside and the polymer later (which may be decorated) on the outside. The resulting product will hold water when the actual flower pot leaks out, for example, and at the same time provides decoration for which otherwise might be a plain pot.

Most of these conventional flower pot covers have a very shiny look and there has been a long standing need to provide a pot cover with an elegant, brushed matte finish. This brushed-like matte type finish is desirable in the art as it has a more elegant look. However, prior art film cannot be easily formed such that a matte finish will hold on the surface. This is due to the fact that one cannot make a polymer matte finish element that can easily have the ability to present color decorations and also to be heat sealed along with the normal aluminum element present. Many attempts have been made to impart this brushed look matte finish to these products without much success. The heat seal lamination of various products used to make decorative pot covers prevent such a matte finish because one cannot apply the requisite adhesive for such heat sealing in addition to any matte finish. Thus, there is a pressing need within the pot cover industry to have a matte finish on the pot cover itself and still maintain all of the other pot cover requirements.

SUMMARY OF THE INVENTION

It is an object of this invention to provide a strong and resilient pot cover for pots within the floral and plant industry. It is a further object to provide such a pot cover with all of the conventional decorative properties and yet also provide this pot cover with an elegant brushed matte finish. These and yet other objects are achieved in a floral pot cover element comprising in order:

(a) an outside forming sheet comprising a heat sealable, biaxially oriented polymer film having two sides placed over a core layer, one of said sides comprising a heat sealable matte skin layer and an ink tinted layer on the second of said sides;

(b) an inside forming sheet comprising a polypropylene film having two sides, one of said sides having been corona treated with a metalized surface and the other side having a heat sealable coating thereon;

wherein the corona treated metalized layer of said polypropylene film (b) is placed against the ink tinted layer of ink tinted layer of heat sealable film (a) and heated under pressure to form a strong and resilient sheet suitable for forming a pot cover. Alternatively, the metalized surface may be replaced by a white, pearlized polypropylene film attached to the corona treated surface of film (b).

In yet another embodiment a pot cover may be formed from sheets (a) and sheet (b) under pressure and heat forming said sheet around a pot-shaped mold having an inner male member and an outer female member whereby insertion of said inner male member into said outer female member in the presence of said sheets (a) and (b) and suitable pot cover is formed therefrom.

BRIEF DESCRIPTION OF THE DRAWINGS

FIG. 1 is a cross section view of the two layers (inside and outside) of the element of this invention prior to heat sealing and forming the pot cover.

FIG. 1a is the sheet formed from FIG. 1.

DETAILED DESCRIPTION OF THE INVENTION

Figure 2:
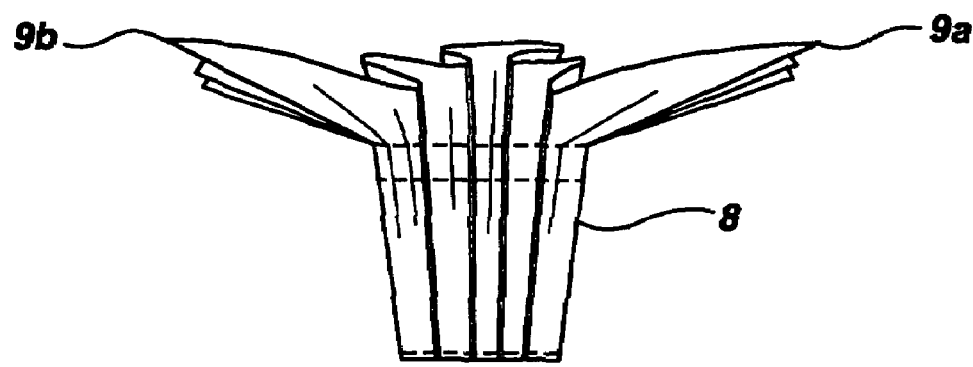
FIG. 2 is a drawing of a typical pot cover that can be made by the process of this invention using the structure shown in FIG. 1.

Looking now specifically at FIG. 1 which shows the various elements that make up the structure that can be manufactured into the matte finish pot cover of this invention, 1 is a heat sealable, biaxially oriented polymer film having a core layer with a heat sealable matte skin layer 2 coated on one side and a ink or dye tinted layer 3 on the other side. This then forms the outside forming sheet A. A polypropylene film 4 (the outside forming sheet) is shown as B firmly laminated along a corona treated layer 5 to A on the dye or ink tinted layer 3. Film 4 may also be metalized or be manufactured from a pearlized white material. The side opposite the corona treated layer has a heat sealable coating 6 applied thereon. This structure is heat laminated to form a sheet shown as 7 in FIG. 1a whilst looking down from the top layer of 1 through matte skin layer 2. The corners of this sheet are shown as 9, 9a, 9b, and 9c. These will form a decorative element up and around the flower or plant pot.

Figure 2A:
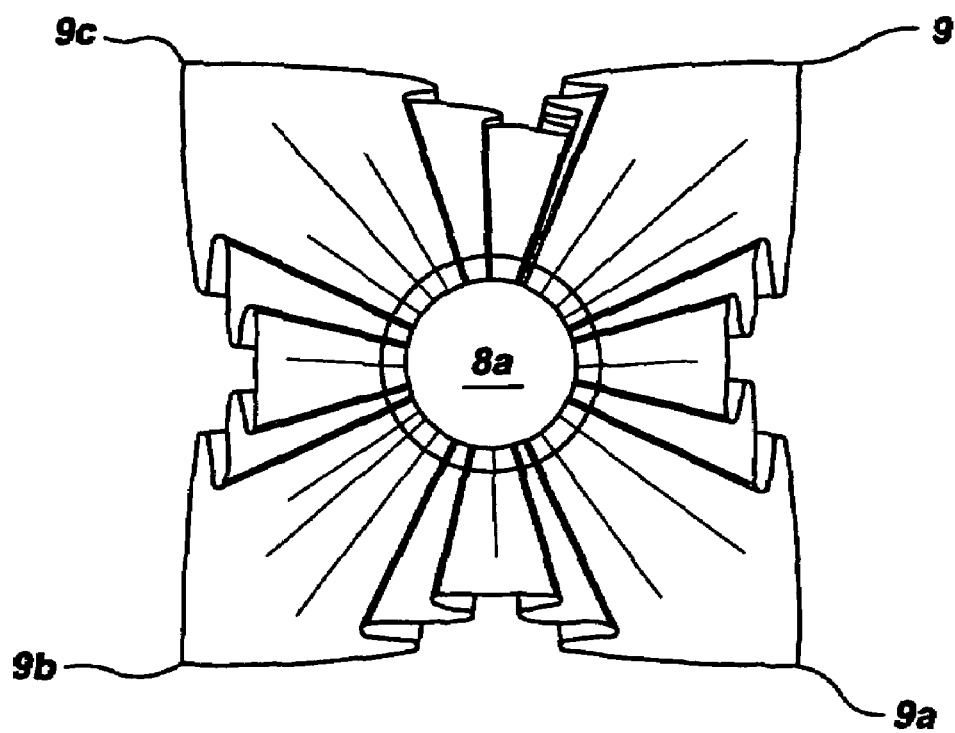
FIG. 2a is a top view of the pot cover described in FIG. 2.

In FIG. 2 we can see a pot cover 8 made from sheet 7 in FIG. 1a. Two of the corners 9a and 9b are shown from FIG. 1a and they form the decorative material that will surround the bottom of the flower or plant pot. Further, in FIG. 2a we have the top view of the pot cover 8 wherein 8a is the interior of the pot cover where the flower or plant pot will be placed. The square corners 9, 9a, 9b, and 9c from FIG. 1a form the decorative material that will surround the bottom of the flower or plant pot.

Figure 3:
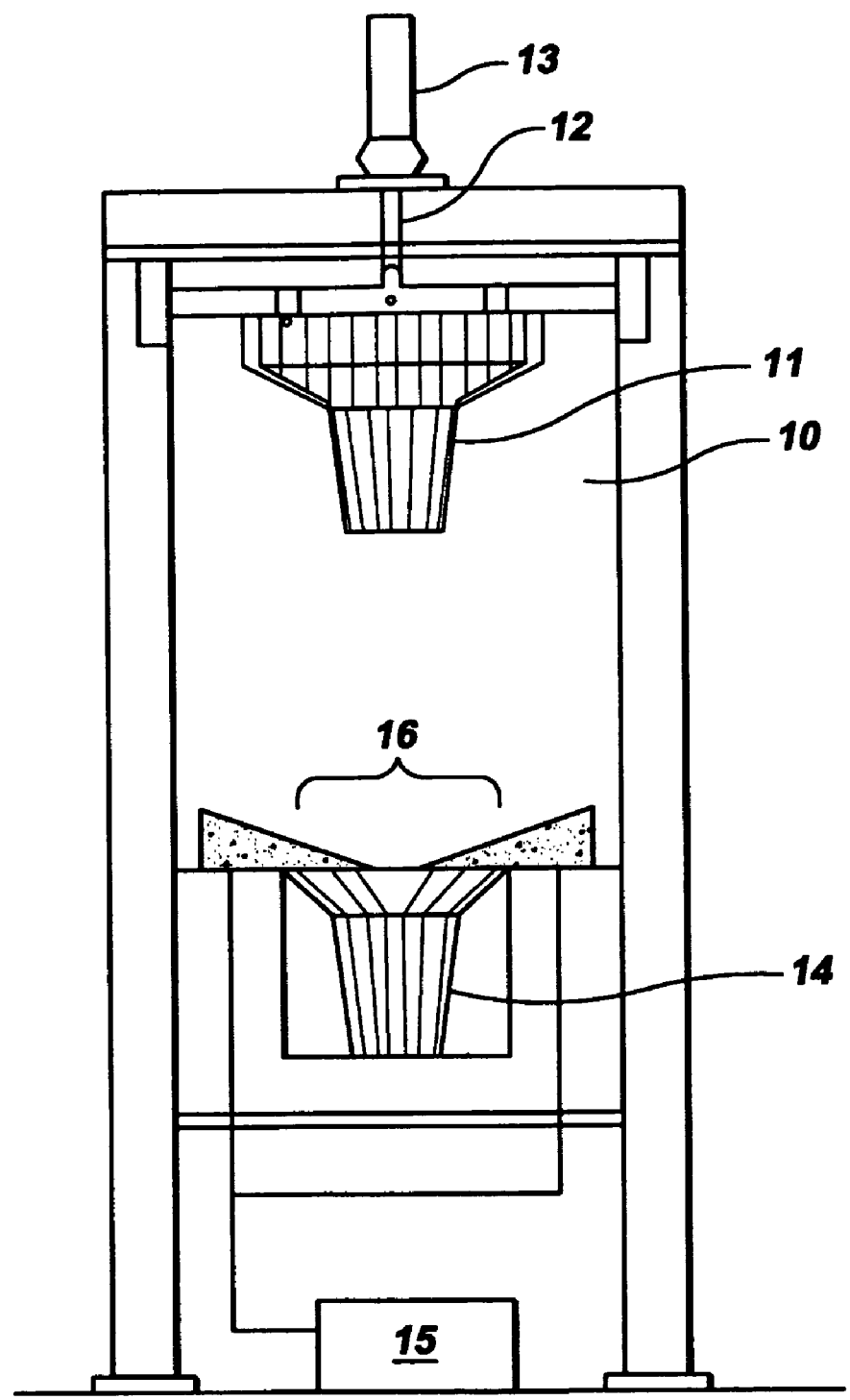
FIG. 3 is a typical pot forming apparatus commonly used to make and manufacture pot covers and which may be used to make the pot cover of FIG. 2 using the structure of FIG. 1.

FIG. 3 is a typical heated pot cover molding device well-known in the prior art. Although this figure might not represent the best mode of molding a pot cover from material made by the teachings of this invention, it will demonstrate the state of the prior art that may be employed. In this figure the entire device is shown as 10. A top male mold 11 is attached to a device that will force this male element downwards and this device is shown as a piston 12 driven by air emanating from 13. The sheet from FIGS. 1 and 1a is laid over the female mold shown. The sheet 6 from FIG. 1a is laid on top of female mold 14 in the general area shown as 16. The operator would then actuate heated male mold 11 which then is forced down into female mold 14 forming the pot cover shown in FIG. 2. A vacuum source is shown as 15. This is not requisite to pot covers formed using the process of this invention but might be needed if the thickness of the sheet were increased so as to draw the sheet down into the female mold 14 as the male mold 11 was forced downward.

The unique feature of this particular pot cover is that it can be formed from a material that is not only heat sealable (which actually permits the folds and frilly edges and corners of this product to be formed) but also possesses a highly desirable matte finish that gives that elegant brushed look to the final product. Another unique feature of this invention is that the ink or dye is "sandwiched" between films (because of reverse lamination) so that this inked or dyed material cannot be rubbed-, scraped- or washed-off. It should be noted that pot covers made using the material elements of this invention and following the machines utile in the art have better qualities than prior art elements. Not only can they be made with colored surfaces and designs and the like and not only do they have the creases, folds and frilliness of prior art elements, they are stronger and can stand up under very hard circumstances. They will hold water without coming apart, for example. Thus, if an external watering system comes on whilst a number of these units are being stored with plants or flowers therein, extra water that might build up because the entire product is designed to be leak free, will not break through the pot cover thus saving losses that usually occur using prior art pot covers.

The most important element layer within the structure of this invention is the heat sealable, biaxially oriented polymer film with a core layer and a heat sealable matte skin layer. This material is a product called Torayfan® HM21 and HM22 produced by Toray Film Corp. from Rhode Island. This material comes prepared with a novel heat sealable coating on one side ready for the user to coat the other side with a colored layer, if desired. Thicknesses of this product are from 0.1 mils to 3.0 mils and the material is strong and resilient. The heat sealable matte layer is a skin of a blend of propylene homopolymer or propylene-ethylene copolymer with high density polyethylene which gives that desired matte finish plus the requisite heat sealable material. A modifying resin such as a propylene based elastomer may also be added. The film may have varying degrees of stiffness. This is shown as layer 1 in the drawings attached hereto. As mentioned before, layer 4 is a standard polypropylene film having a corona treated side and a side coated with a standard heat sealable layer 6 on the other side. This is placed with the corona treated side against the biaxially oriented polymer film 1 against the non-heat sealable layer, or a side that has been tinted or dyed 3. As the pot cover is formed the heat sealable layer 6 will crush down to form the unique folds and skirt of the pot cover.

I am not limited to that specifically described herein as other modalities of the various elements may be modified as is well-known in the prior art. My film yields a novel and unusual matte finished product that has that desirable brush like finish. No other pot cover available or offered in the prior art will yield such a desirable matte finish.

I claim:

1. An element useful in forming a floral pot cover comprising in order:
    (a) an outside forming sheet comprising a heat sealable, biaxially oriented polymer film having two sides over a core layer, one of said sides comprising a heat sealable matte skin layer and an ink tinted layer on the other of said sides;
    (b) an inside forming sheet comprising a polypropylene film having two sides, one of said sides having been corona treated and having a metalized surface applied thereon and the other side having a heat sealable coating thereon;
    wherein the corona treated metalized layer of said polypropylene film (b) is placed against the ink tinted layer of ink tinted layer of heat sealable film (a) and heated to form a strong and resilient film useful in forming a floral pot cover.

2. The pot cover of claim 1 wherein the heat sealable matte skin layer comprises a blend of a propylene homopolymer mixed with high density polyethylene and a quantity of propylene based elastomer.

3. The pot cover of claim 1 wherein layer (a) has a thickness of between 0.1 mils to 3.0 mils.

4. An element useful in forming a floral pot cover comprising in order:
    (a) an outside forming sheet comprising a heat sealable, biaxially oriented polymer film having two sides over a core layer, one of said sides comprising a heat sealable matte skin layer and an ink tinted layer on the other of said sides;
    (b) an inside forming sheet comprising a polypropylene film having two sides, one of said sides having been corona treated and having a white, pearlized polypropylene film attached thereto and the other side having a heat sealable coating thereon;
    wherein the corona treated white, pearlized side of said polypropylene film (b) is placed against the ink tinted layer of ink tinted layer of heat sealable film (a) and heated to form a strong and resilient film useful in forming a floral pot cover.

5. A process of making a pot cover from the sheet of claim 1 in an apparatus comprising:
- (a) a female die having an opening on one end thereof;
- (b) a male die positioned vertically above female die (a) and shaped such so that said male die fits the opening of female die (a);
- (b) positioning the sheet of claim 1 between said female die opening and said male die;
- (c) providing an air supply above male die (b) and subsequently permitting male die (b) to forcefully enter female die (a) under heat and pressure;

so as to form a floral pot cover from the sheet of claim 1 or claim 4.

* * * * *